United States Patent
Song

(10) Patent No.: US 11,659,619 B2
(45) Date of Patent: May 23, 2023

(54) METHOD AND APPARATUS FOR PERFORMING CONFIRMED-BASED OPERATION IN MACHINE TO MACHINE SYSTEM

(71) Applicants: Hyundai Motor Company, Seoul (KR); Kia Motors Corporation, Seoul (KR); Industry Academy Cooperation Foundation of Sejong University, Seoul (KR)

(72) Inventor: Jae Seung Song, Seoul (KR)

(73) Assignees: Hyundai Motor Company, Seoul (KR); Kia Motors Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 28 days.

(21) Appl. No.: 17/172,284

(22) Filed: Feb. 10, 2021

(65) Prior Publication Data

US 2021/0251038 A1     Aug. 12, 2021

Related U.S. Application Data

(60) Provisional application No. 63/014,936, filed on Apr. 24, 2020, provisional application No. 62/972,714, filed on Feb. 11, 2020.

(51) Int. Cl.
| | | |
|---|---|---|
| *H04W 4/00* | (2018.01) | |
| *H04L 29/06* | (2006.01) | |
| *H04W 76/30* | (2018.01) | |
| *H04W 68/00* | (2009.01) | |
| *H04W 4/70* | (2018.01) | |

(52) U.S. Cl.
CPC ............ *H04W 76/30* (2018.02); *H04W 4/70* (2018.02); *H04W 68/005* (2013.01)

(58) Field of Classification Search
CPC ...... H04W 76/30; H04W 4/70; H04W 68/005
USPC ........................................................ 370/329
See application file for complete search history.

(56) References Cited

U.S. PATENT DOCUMENTS

| | | | | |
|---|---|---|---|---|
| 2003/0151621 A1* | 8/2003 | McEvilly | ......... | H04N 21/47202 348/E7.071 |
| 2004/0078216 A1* | 4/2004 | Toto | ....... | G16H 10/20 707/999.1 |
| 2004/0123313 A1* | 6/2004 | Koo | ...... | H04N 21/6581 725/31 |
| 2004/0148506 A1* | 7/2004 | Prince | ...... | H04L 51/212 713/176 |
| 2004/0192299 A1* | 9/2004 | Wilson | ........ | H04W 64/00 455/433 |
| 2005/0125273 A1* | 6/2005 | Simons | ........ | G06Q 10/10 705/7.22 |
| 2006/0212394 A1* | 9/2006 | Terada | ........ | G06Q 20/367 705/41 |

(Continued)

*Primary Examiner* — Mark G. Pannell
(74) *Attorney, Agent, or Firm* — Fox Rothschild LLP

(57) ABSTRACT

An operation method is provided for deleting a resource in an M2M system. The operation method includes receiving a first deletion request message requesting deletion of a resource from a counterpart M2M apparatus and transmitting a first deletion response message for the first deletion request message to the counterpart M2M apparatus. A second deletion request message is received that requests deletion of the resource from the counterpart M2M apparatus and the resource is deleted.

15 Claims, 10 Drawing Sheets

(56) References Cited

U.S. PATENT DOCUMENTS

| | | | |
|---|---|---|---|
| 2007/0271328 A1* | 11/2007 | Geelen | H04L 67/62 |
| | | | 709/201 |
| 2008/0034314 A1* | 2/2008 | Louch | G06F 3/0481 |
| | | | 715/764 |
| 2009/0228322 A1* | 9/2009 | van Os | G06Q 10/1093 |
| | | | 705/7.18 |
| 2011/0065082 A1* | 3/2011 | Gal | G09B 7/02 |
| | | | 434/365 |
| 2013/0138424 A1* | 5/2013 | Koenig | G10L 21/00 |
| | | | 704/9 |
| 2014/0287786 A1* | 9/2014 | Bayraktar | H04W 4/14 |
| | | | 455/466 |
| 2015/0134428 A1* | 5/2015 | Li | G06Q 20/326 |
| | | | 705/13 |
| 2015/0205747 A1* | 7/2015 | Dees | H04M 1/72412 |
| | | | 710/303 |
| 2017/0039372 A1* | 2/2017 | Koval | H04L 67/06 |
| 2018/0248971 A1* | 8/2018 | Park | H04W 12/06 |
| 2019/0014570 A1* | 1/2019 | Nam | H04W 72/046 |
| 2019/0140837 A1* | 5/2019 | Cheng | H04W 12/40 |
| 2020/0084610 A1* | 3/2020 | Salmela | H04W 60/06 |
| 2021/0160340 A1* | 5/2021 | Narayanan | H04L 67/561 |
| 2021/0182240 A1* | 6/2021 | Dongieux | H04L 9/0643 |
| 2022/0029994 A1* | 1/2022 | Choyi | H04W 48/18 |
| 2022/0030431 A1* | 1/2022 | Peylo | H04W 60/06 |

\* cited by examiner

METHOD AND APPARATUS FOR PERFORMING CONFIRMED-BASED OPERATION IN MACHINE TO MACHINE SYSTEM

CROSS REFERENCE TO RELATED APPLICATION

The present application claims priority to a U.S. provisional application 62/972,714, filed Feb. 11, 2020 and a U.S. provisional application 63/014,936, filed Apr. 24, 2020, the entire contents of which are incorporated herein for all purposes by this reference.

BACKGROUND

Field of the Disclosure

The present disclosure relates to an operation performing method and apparatus for a resource in a machine-to-machine (M2M) system, and more particularly, to a method and apparatus for performing an operation based on whether the operation is confirmed.

Description of the Related Art

Recently, introduction of Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present disclosure is directed to provide a method and apparatus for requesting confirmation and performing a confirmation-based operation for a resource in an M2M system. In particular, the present disclosure is directed to provide a method and apparatus for requesting confirmation of deletion for a resource and for deleting the resource according to a confirmation result. According to the present disclosure, data may be deleted based on a confirmation result for deletion according to a characteristic of data or a resource in an M2M system.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
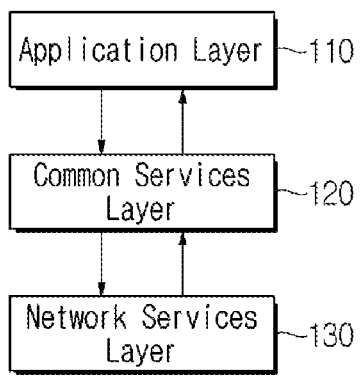
FIG. 1 is a view illustrating a layered structure of an Machine-to-Machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and is not limited to the embodiment described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

Further, oneM2M is a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of an Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
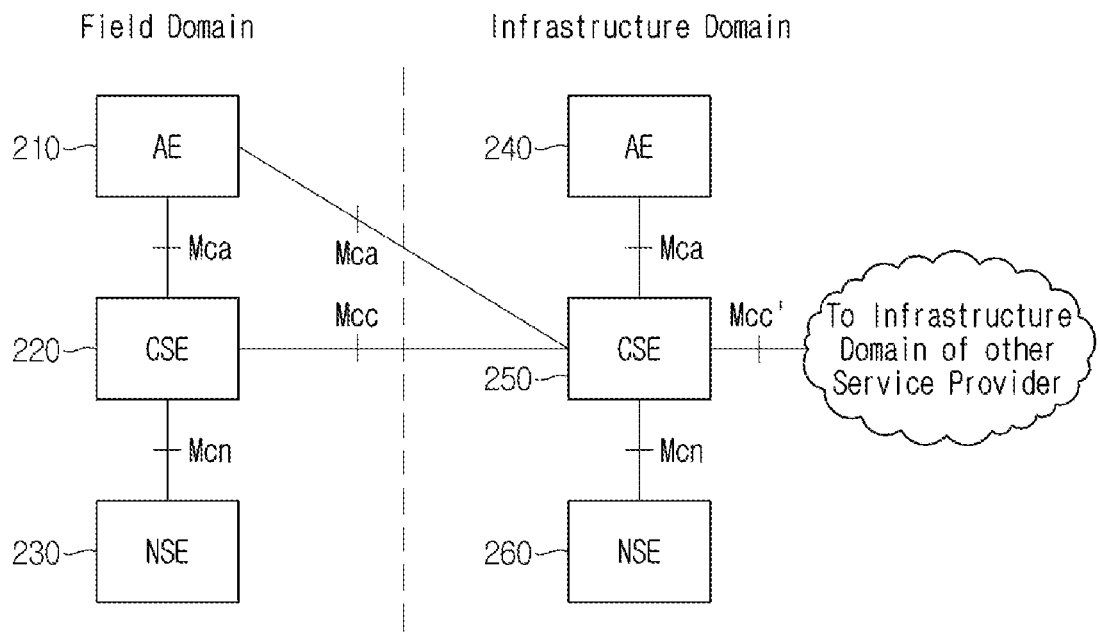
FIG. 2 is a view illustrating reference points in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
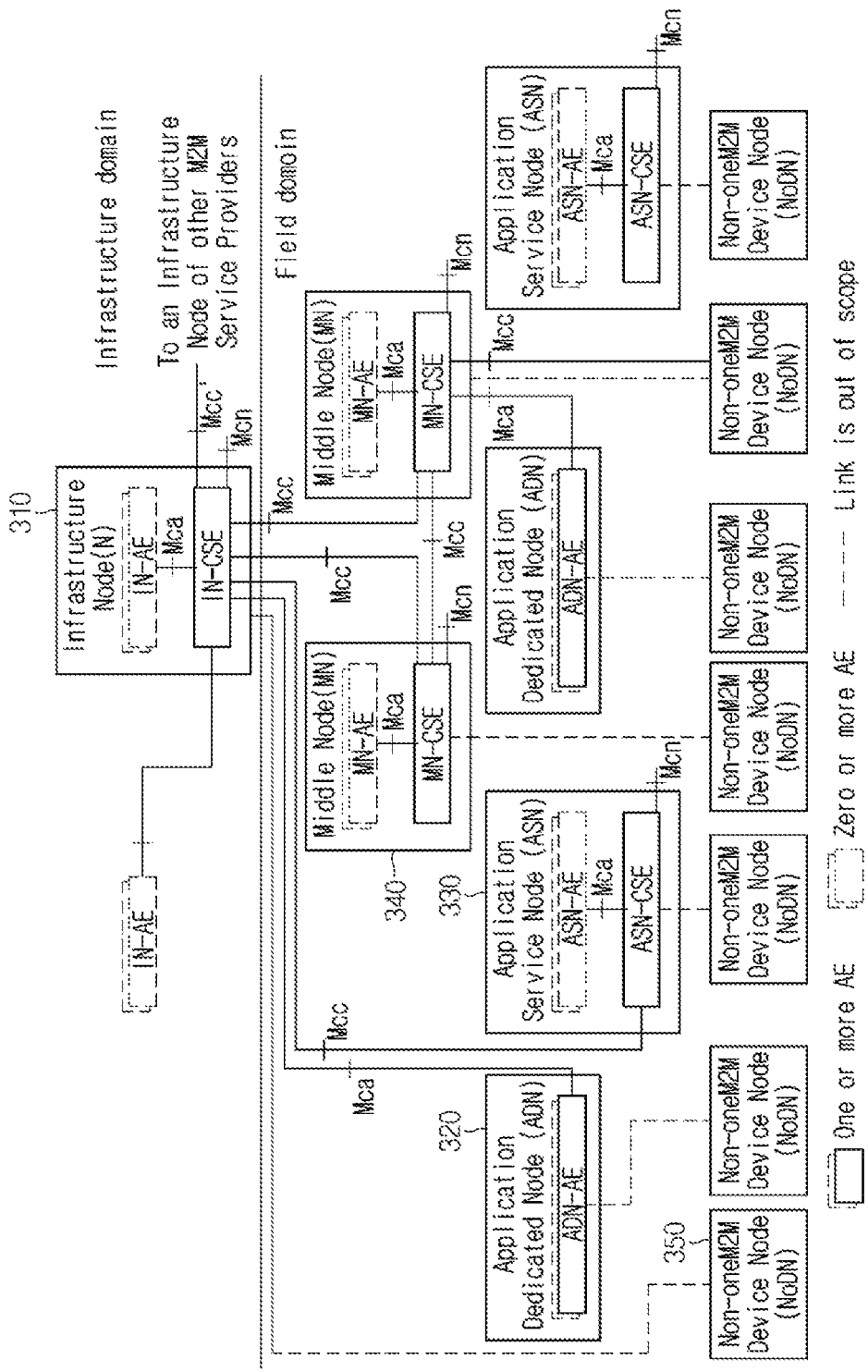
FIG. 3 is a view illustrating each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
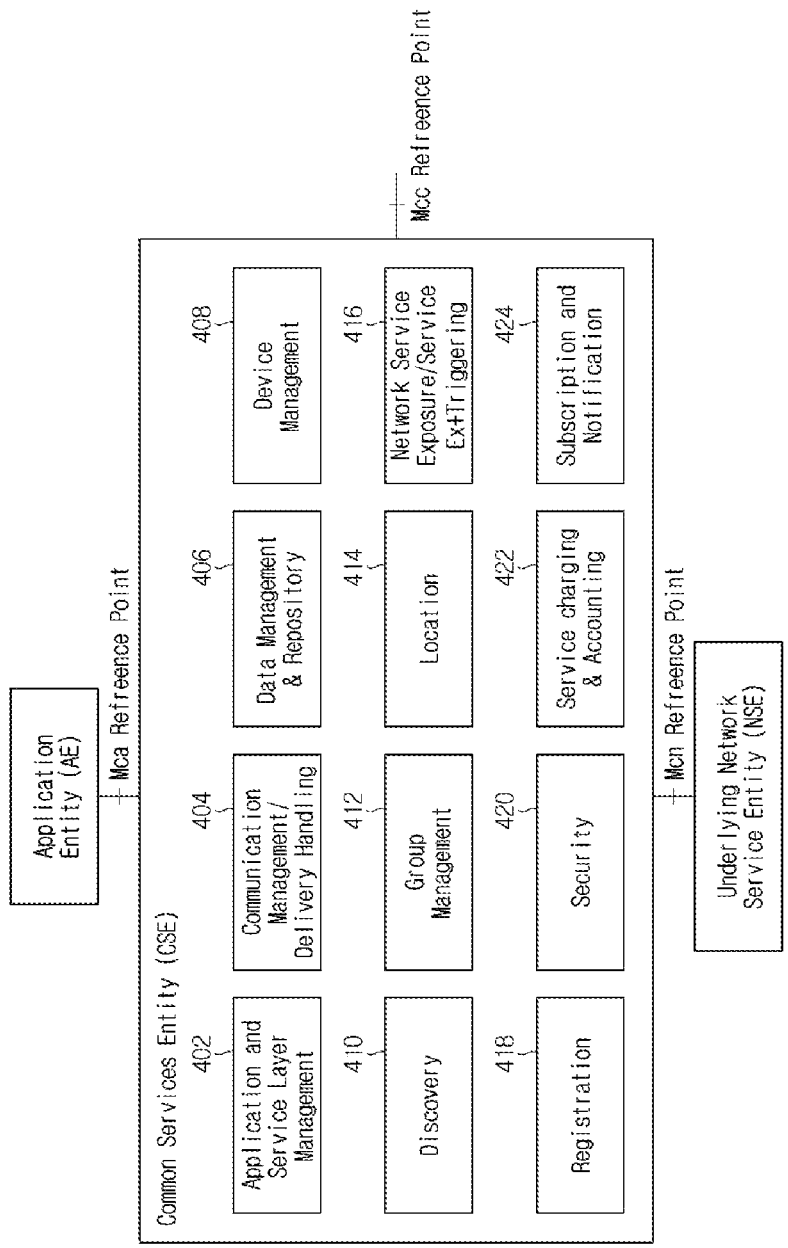
FIG. 4 is a view illustrating a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
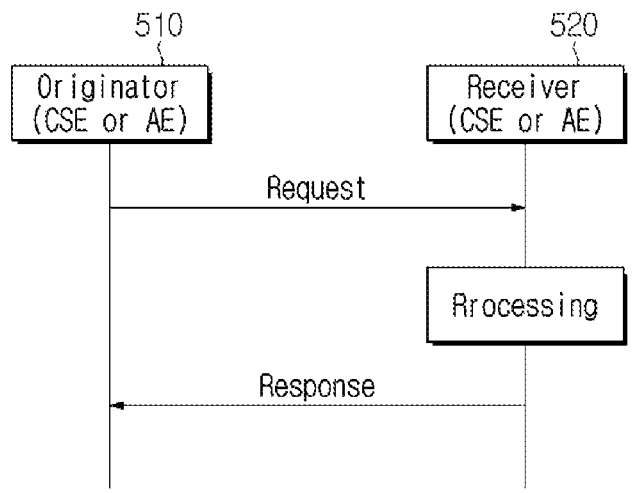
FIG. 5 is a view illustrating that an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code - successful, unsuccessful, ack
Request Identifier - uniquely identifies a Request message
Content - to be transferred
To - the identifier of the Originator or the Transit CSE that sent the corresponding non-blocking request
From - the identifier of the Receiver
Originating Timestamp - when the message was built
Result Expiration Timestamp - when the message expires
Event Category - what event category shall be used for the response message
Content Status
Content Offset
Token Request Information
Assigned Token Identifiers
Authorization Signature Request Information
Release Version Indicator - the oneM2M release version that this response message conforms to A filter criteria condition, which can be used in a request message or a response message, may be defined as in Table 2 and Table 3 below.

TABLE 2

| Condition tag | Multi-plicity | Description |
|---|---|---|
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator=Sam", "creator=Sam*", "creator=*Sam". |
| childAttribute | 0 . . . n | A child of the matched resource meets the condition provided. The evaluation of this condition is similar to the attribute matching condition above. |

TABLE 2-continued

Matching Conditions

| Condition tag | Multi-plicity | Description |
|---|---|---|
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

Filter Handling Conditions

| Condition tag | Multi-plicity | Description |
|---|---|---|
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. ../tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Resources are specified in terms of CSE. Resources are the representations of components and elements in CSE in a

TABLE 4

| | Request message parameter |
|---|---|
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |
| | Authorization Signature Indicator - for use in Authorization Relationship Mapping |
| | Authorization Signature - for use in Authorization Relationship Mapping |
| | Authorization Relationship Indicator - for use in Authorization Relationship Mapping |
| | Semantic Query Indicator - for use in semantic queries |
| | Release Version Indicator - the oneM2M release version that this request message conforms to. |
| | Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the oneM2M system. Application data and commands representing other CSEs, AEs, and sensors are notified as means of resource representations to a CSE. A resource is a uniquely addressable entity in a oneM2M architecture. A resource may be delivered and be manipulated using CRUD (Create Retrieve Update Delete) operations. A child resource is a sub-resource of another resource that is a parent resource. A parent resource includes reference for at least one child resource.

An attribute includes resource-related information. When a set of attributes is not common to all the resources, the set of attributes is not enumerated in a graphic representation of a resource. Attributes are classified into universal attributes, common attributes, and resource-specific attributes. A universal attribute appears to every resource, a common attribute appears to a plurality of resources and has a same meaning. Examples of universal attributes, which are not declared or virtual and are general and universal to every resource type, are shown in Table 5 below.

TABLE 5

| Attribute Name | Description |
| --- | --- |
| resourceType | Resource Type. This Read Only (assigned at creation time, and then cannot be changed) attribute identifies the type of the resource as specified in clause 9.6. Each resource shall have a resourceType attribute. |
| resourceID | This attribute is an identifier for the resource that is used for 'non-hierarchical addressing method', i.e. this attribute shall contain the 'Unstructured-CSE-relative-Resource-ID' format of a resource ID as defined in table 7.2-1.<br>This attribute shall be provided by the Hosting CSE when it accepts a resource creation procedure. The Hosting CSE shall assign a resourceID which is unique in that CSE. |
| resourceName | This attribute is the name for the resource that is used for 'hierarchical addressing method' to represent the parent-child relationships of resources. See clause 7.2 for more details.<br>This attribute may be provided by the resource creator. The Hosting CSE shall use a provided resourceName as long as it does not already exist among child resources of the targeted parent resource. If the resourceName already exists, the Hosting CSE shall reject the request and return an error to the Originator. The Hosting CSE shall assign a resourceName if one is not provided by the resource creator. |
| parentID | This attribute is the resourceID of the parent of this resource. The value of this attribute shall be NULL for the <CSEBase> resource type. |
| creationTime | Time/date of creation of the resource.<br>This attribute is mandatory for all resources and the value is assigned by the system at the time when the resource is locally created. Such an attribute cannot be changed. |
| lastModifiedTime | Last modification time/date of the resource.<br>The lastModifiedTime value is set by the Hosting CSE when the resource is created, and the lastModifiedTime value is updated when the resource is updated. |

Examples of commonly used attributes, which are not declared or virtual and are general and used in not all but a plurality of resource types, are shown in Table 6 below.

TABLE 6

| Attribute Name | Description |
| --- | --- |
| accessControlPolicyIDs | The attribute contains a list of identifiers for <accessControlPolicy> resources. The privileges defined in the <accessControlPolicy> resources that are referenced determine who is allowed to access the resource containing this attribute for a specific purpose (e.g. Retrieve, Update, Delete, etc.).<br>For an Update or Delete operation to a resource, the update or delete of the accessControlPolicyIDs attribute, if applicable, shall be performed prior to the update or delete of any other attributes of the resource.<br>To update this attribute, a Hosting CSE shall check whether an Originator has Update privilege in any selfPrivileges, regardless of privileges, of the <accessControlPolicy> resources which this attribute originally references.<br>After successful update of the accessControlPolicyIDs attribute, resource access checking for other attributes to be updated shall use the new privileges defined in the <accessControlPolicy> resource(s) that are referenced by the newly updated accessControlPolicyIDs attribute.<br>Similarly, to delete this attribute, a Hosting CSE shall check whether an Originator has Updateprivilege in any selfPrivileges, regardless of privileges, of the <accessControlPolicy> resources which this attribute originally references.<br>After successful deletion of the accessControlPolicyIDs attribute, resource access checking for other attributes to be deleted shall use the default access privileges as described in the following paragraphs.<br>If a resource type does not have an accessControlPolicyIDs attribute definition, then the accessControlPolicyIDs for that resource is governed in a different way, for example, the accessControlPolicy associated with the parent may apply to a child resource that does not have an accessControlPolicyIDs attribute definition, or the privileges for access are fixed by the system. Refer to the corresponding resource type definitions and procedures to see how access control is handled in such cases.<br>If a resource type does have an accessControlPolicyIDs attribute definition, but the (optional) accessControlPolicyIDs attribute value is not set in a resource instance, then the Hosting CSE shall apply the concept of the default access policy. The default policy shall provide unrestricted access only to the Originator of the successful resource creation request. All other entities shall be denied to access the resource. For that purpose, the Hosting CSE shall keep that Originator information of the resource. Note that how to keep that information is implementation specific. The default access policy is not applied to a resource which has a value assigned to the accessControlPolicyIDs attribute.<br>All resources are accessible if and only if the privileges (i.e. configured as privileges or selfPrivileges attribute of <accessControlPolicy> resource) allow it, therefore all resources shall have an associated accessControlPolicyIDs attribute, either explicitly |

TABLE 6-continued

| Attribute Name | Description |
| --- | --- |
| | (setting the attribute in the resource itself) or implicitly (either by using the parent privileges or the system default policies). Which means that the system shall provide default access privileges in case that the Originator does not provide a specific accessControlPolicyIDs during the creation of the resource. |
| expirationTime | Time/date after which the resource will be deleted by the Hosting CSE. This attribute can be provided by the Originator, and in such a case it will be regarded as a hint to the Hosting CSE on the lifetime of the resource. The Hosting CSE shall configure the expirationTime value. If the Hosting CSE configures the new expirationTime attribute value rather than the Originator suggested value, the new value can be sent back to the Originator depending on the Result Content value.<br>The lifetime of the resource can be extended by providing a new value for this attribute in an UPDATE operation. Or by deleting the attribute value, e.g. by updating the attribute with NULL when doing a full UPDATE, in which case the Hosting CSE can decide on a new value.<br>If the Originator does not provide a value in the CREATE operation the system shall assign an appropriate value depending on its local policies and/or M2M service subscription agreements.<br>A resource is known as 'obsolete' when the resource contains the attribute "expirationTime" and the lifetime of this resource has reached the value of this attribute. If the 'obsolete' resource had a reference to an Application Entity Resource ID, the Hosting CSE shall send a NOTIFY request to the IN-CSE, requesting to delete the entry from the <AEContactList> resource. |
| stateTag | An incremental counter of modification on the resource. When a resource is created, this counter is set to 0, and it will be incremented on every modification of the resource (see notes 1 and 2). |
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26.<br>For the original resource, this attribute shall only be present if it has been successfully announced to other CSEs. This attribute maintains the list of the resource addresses to the successfully announced resources. Updates on this attribute will trigger new resource announcement or de-announcement.<br>If announceTo attribute includes resource address(es), the present document does not provide any means for validating these address(es) for announcement purposes. It is the responsibility of the Hosting-CSE referenced by the resource address(es) to validate the access privileges of the originator of the Request that triggers the announcement. |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| labels | Tokens used to add meta-information to resources.<br>This attribute is optional.<br>The value of the labels attribute is a list of individual labels, each of them being:<br>0    Either a standalone label-key, used as a simple "tag", that can be used for example for discovery purposes when looking for particular resources that one can "tag" using that label-key<br>1    Or a composite element made of a label-key and a label-value, separated by a special character defined in [3].<br>The list of allowed characters in a label (and in label-keys and label-values) and separator characters is defined in [3], clause 6.3.3. |
| e2eSecInfo | Present in a resource representing an AE or CSE. Indicates the end-to-end security capabilities supported by the AE or CSE. May indicate supported end-to-end security frameworks. May also contains a certificate or credential identifier used by the AE or CSE. May include random values for use in end-to-end security protocols. The details of this attributes are described in oneM2M TS-0003 [2].<br>This attribute is optional and if not present it means that the represented entity does not support oneM2M end-to-end security procedures. |
| DynamicAuthorization ConsultationIDs | This attribute contains a list of identifiers of <dynamicAuthorizationConsultation> resources. The information defined in a <dynamicAuthorizationConsultation> resource is used by a CSE for initiating consultation-based dynamic authorization requests. Consultation-based dynamic authorization is only performed for a targeted resource if and only if it is linked to an enabled <dynamicAuthorizationConsultation> resource. If the attribute is not set or has a value that does not correspond to a valid <dynamicAuthorizationConsultation> resource(s), or it refers to an <dynamicAuthorizationConsultation> resource(s) that is not reachable, then the dynamicAuthorizationConsultationIDs associated with the parent may apply to the child resource if present, or a system default <dynamicAuthorizationConsultation> may apply if present. |

A current oneM2M mechanism for deleting data is limited for supporting various emerging IoT/M2M applications. For example, data deletion should be discreetly performed depending on the importance of data. On the other hand, according to the oneM2M mechanism, data deletion generally tends to be performed irrespective of the importance of data. Accordingly, an error may occur while an operation of deleting data is performed.

When user experience (UX) is implemented, an error needs to be minimized. Error frequency and severity are negatively related to the usability of a system. One of common ways to reduce such errors is to use a confirmation dialog that requests confirmation of operation. The confirmation dialog is a dialog for confirming users wish to proceed with an input command t. To the reduce errors of a system, a similar concept to confirmation dialog may be applied to a oneM2M mechanism.

As described above, depending on a characteristic of data or an application, an algorithm is needed to delete data under a predetermined condition. Herein, the predetermined condition may be defined in various ways. For example, conditions for deleting data may be related to the importance of corresponding data and resources. Therefore, the present disclosure suggests a method for deleting data and/or a resource based on a characteristic of data and/or the resource. According to an exemplary embodiment of the present disclosure, a feature about a confirmation-based operation may be given to data and/or a resource. A feature about a confirmation-based operation may be given to a resource for storing data.

To indicate a feature about a confirmation-based operation, the attribute of Table 7 may be added to the attributes of Table 6 that are commonly used.

TABLE 7

| Attribute Name | Description |
|---|---|
| confirmationOper | This attribute provides information about which operations are needed to have confirmation from an Originator. This attribute is optional. The existence of this attribute indicates to perform the confirmation-based operation that needs the confirmation from the Originator. The value of this attribute provides information about subject operations, i.e., CRUDN. If only 'C' is used as the value of this attribute, only a CREATE request is a subject for the confirmation-based operation. |

When performing an operation, an attribute (e.g., <confirmationOper>) related to a confirmation-based operation may provide information regarding whether confirmation of an originator is required. In addition, an attribute related to a confirmation-based operation may indicate a subject operation that requires confirmation from an originator. Herein, the operation subject to the attribute related on the confirmation-based operation may be one of the following operations: CREATE, RETRIEVE, DELETE, UPDATE and NOTIFY.

When a resource is related to important data or has an attribute associated with a confirmation-based operation, every operation and/or a specifically indicated operation (e.g., DELETE operation) for the resource is performed based on a confirmation result. In other words, to request a DELETE operation, an AE should further transmit a request for the DELETE operation or transmit confirmation information regarding the requested DELETE operation.

Figure 6:
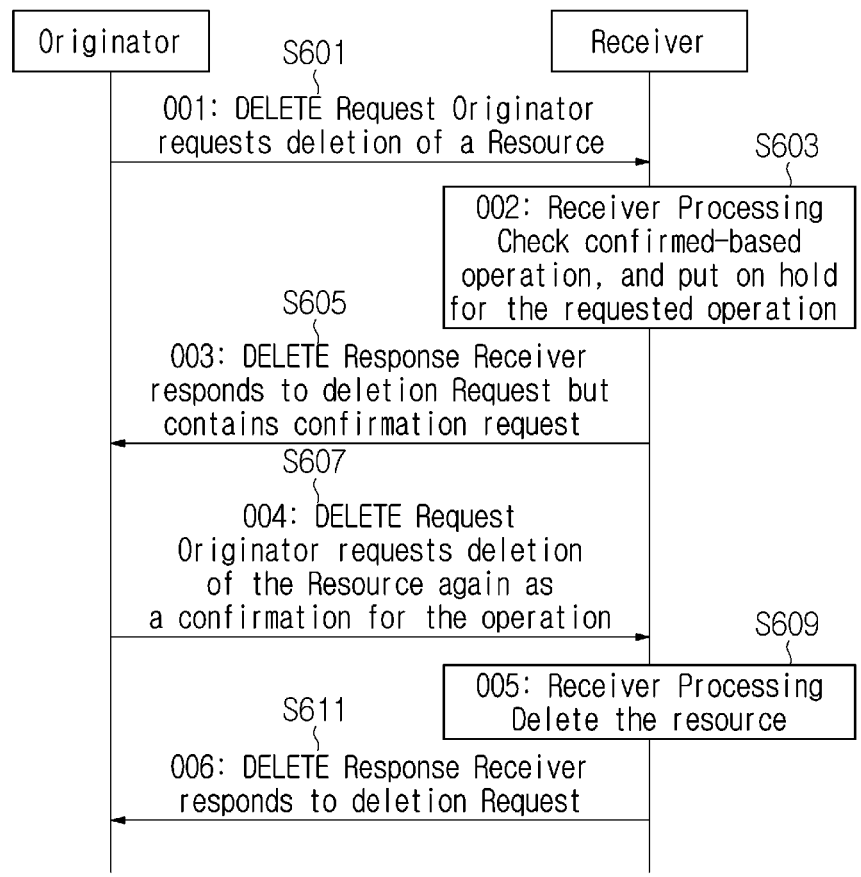
FIG. 6 is a view showing a process of deleting a resource in an M2M system according to the present disclosure.

Hereinafter, 'generation of a resource' will be used in the same meaning as 'generation of data', and 'deletion of a resource' is used in the same meaning as 'deletion of data'. Generally, the deletion of a resource may be performed at an explicit request. The process is illustrated in FIG. 6 below. FIG. 6 is a view showing a process of deleting a resource in an M2M system according to the present disclosure. The operation subjects of FIG. 6 may be an originator and a receiver.

Referring to FIG. 6, in the step S601, the originator is configured to transmit a first deletion request message requesting deletion of a resource to the receiver. The first deletion request message may include parameters of a request message of an M2M system and specifically include information indicating an operation to be requested, a sending subject, a receiving subject, and a request identifier specifying the first deletion request message. In addition, the resource indicated by the first deletion request message may include an attribute related to a confirmation-based operation. The resource including the attribute related to the confirmation-based operation may be referred to as a confirmation-based resource.

In the step S603, the receiver may be configured to confirm whether the resource indicated by the deletion request message to be deleted. The receiver may be configured to confirm whether the originator sending the first deletion request message has a resource deletion right and whether there exists a resource indicated by the first deletion request message.

In addition, the receiver may be configured to confirm whether a deletion operation of the resource indicated by the first deletion request message is a confirmation-based operation. Specifically, the receiver may be configured to confirm whether the resource indicated by the first deletion request message includes an attribute related to a confirmation-based operation and whether the deletion operation indicated by the first deletion request message is an operation subject to the attribute related to the confirmation-based operation. When the resource indicated by the first deletion request message includes an attribute related to a confirmation-based operation and the deletion operation is subject to the attribute related to the confirmation-based operation, the receiver may suspend the operation of deleting the resource.

In the step S605, the receiver is configured to transmit a first deletion response message for the first deletion request message to the originator. Herein, the first deletion response message may include parameters of a response message of an M2M system. Specifically, the first deletion response message may include a response status and a request identifier specifying a request message (e.g., a first deletion request message). Herein, the response status may indicate ACK for a first deletion response message. In addition, the first deletion response message may further include information requesting confirmation for the deletion of a resource.

In the step S607, the originator is configured to transmit a second deletion request message requesting deletion of a resource to the receiver. The second deletion request message may include information indicating at least one of an operation to be requested, a sending subject, a receiving subject, and a request identifier specifying the second deletion request message. In the step S609, the receiver may be configured to delete a resource indicated by the first deletion request message and the second deletion request message. The receiver may be configured to confirm whether the originator transmitting the second deletion request message has a resource deletion right and whether there exists a resource indicated by the second deletion request message and may be configured to delete the resource.

In the step S611, the receiver is configured to transmit a second deletion response message for the second deletion request message to the originator. Herein, the second deletion response message may include a response status, a request identifier, and parameters of a response message of an M2M system. Herein, the response status may indicate a deletion complete status of a resource according to a request of the originator.

When a deletion request message for requesting the deletion of a resource is sent two times, the second deletion request message may be transmitted after a predetermined period since the transmission time of the first deletion request message. Herein, it is desirable that the receiver does not stand by without a promise for reception of the second deletion request message including confirmation information. To prevent communication performance from being affected by the receiver's standing by for the second deletion request message, a resource including an attribute related to a confirmation-based operation in an M2M system may further include a time-window attribute. A process of deleting a resource based on a time-window attribute may be described as follows.

Figure 7:
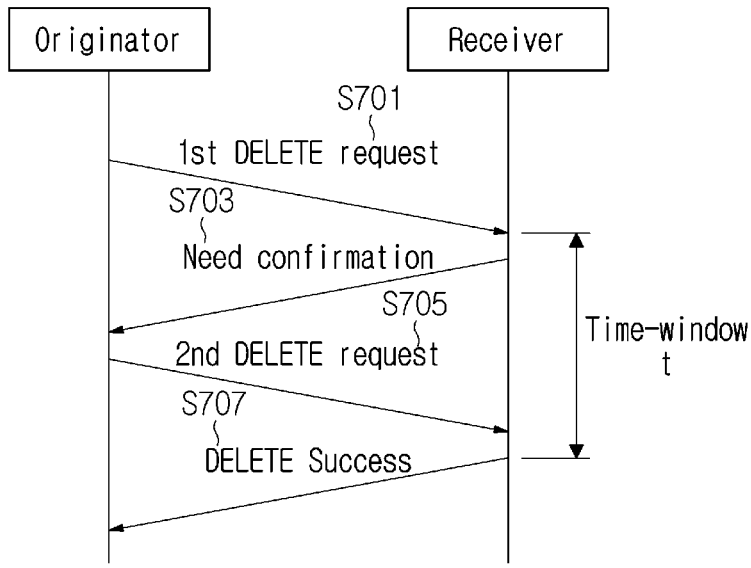
FIG. 7 is a view showing a first embodiment of a process for deleting a resource based on time-window in an M2M system according to the present disclosure.

FIG. 7 is a view showing a first exemplary embodiment of a process for deleting a resource based on time-window in an M2M system according to the present disclosure. The operation subjects of FIG. 7 may be an originator and a receiver. In FIG. 7, a resource to be deleted includes an attribute related to a confirmation-based operation, and the attribute is set as a value indicating that a deletion operation needs to be confirmed. Referring to FIG. 7, in the step S701, the originator is configured to transmit a first deletion request message requesting deletion of a resource to the receiver. The first deletion request message may include parameters of a request message of an M2M system and specifically include information indicating an operation to be requested, a sending subject, a receiving subject, and a request identifier specifying the first deletion request message.

In the step S703, the receiver may be configured to transmit a confirmation request message requesting confirmation for the deletion of a resource indicated by the first deletion request message to the originator. The confirmation request message may indicate ACK for the first deletion request message. In the step S705, the originator is configured to transmit a second deletion request message requesting deletion of a resource to the receiver. The second deletion request message may include information indicating an operation to be requested, a sending subject, a receiving subject, and a request identifier specifying the second deletion request message. The receiver may be configured to receive the second deletion request message within a time-window indicated by an attribute of resource from a receiving time of the first deletion request message. In response to receiving the second deletion request message within a time-window indicated by an attribute of resource from a receiving time of the first deletion request message, the receiver may be configured to delete a resource indicated by the second deletion request message.

In the step S707, the receiver is configured to transmit a deletion response message indicating that the resource indicated by the second deletion request message is deleted to the originator. Herein, the deletion response message may indicate a deletion complete status of a resource according to a request of the originator.

Figure 8:
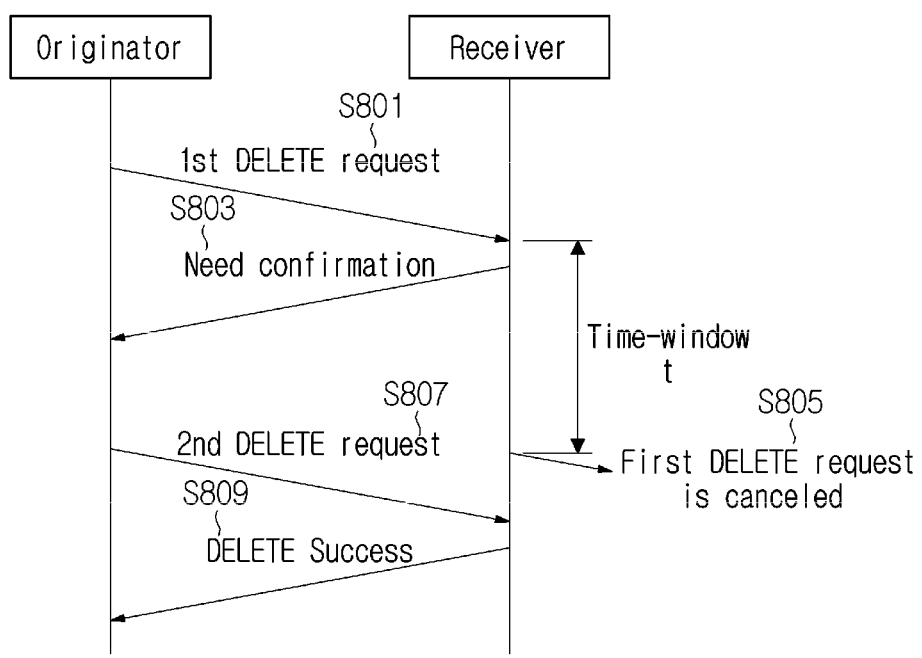
FIG. 8 is a view showing a second embodiment of a process for deleting a resource based on time-window in an M2M system according to the present disclosure.

FIG. 8 is a view showing a second exemplary embodiment of a process for deleting a resource based on time-window in an M2M system according to the present disclosure. The operation subjects of FIG. 8 may be an originator and a receiver. In FIG. 8, a resource to be deleted includes an attribute related to a confirmation-based operation, and the attribute is set as a value indicating that a deletion operation needs to be confirmed.

Referring to FIG. 8, in the step S801, the originator is configured to transmit a first deletion request message requesting deletion of a resource to the receiver. The first deletion request message may include parameters of a request message of an M2M system and specifically include information indicating an operation to be requested, a sending subject, a receiving subject, and a request identifier specifying the first deletion request message. The receiver receiving the first deletion request message may be configured to remain in a standby mode for reception of a second deletion request message.

In the step S803, the receiver may be configured to transmit a confirmation request message requesting confirmation for the deletion of a resource indicated by the first deletion request message to the originator. The confirmation request message may indicate ACK for the first deletion request message. In the step S805, when the second deletion request message is not received until the end of a time-window indicated by an attribute of resource from a receiving time of the first deletion request message, the receiver may be configured to release a stand-by status for receiving a second deletion request message and suspend a deletion operation of a resource indicated by the first deletion request message.

In the step S807, the originator is configured to transmit the second deletion request message requesting deletion of a resource to the receiver. The second deletion request message may include information indicating an operation to be requested, a sending subject, a receiving subject, and a request identifier specifying the second deletion request message.

In the step S809, the receiver is configured to transmit a deletion response message, which is a response message for the second deletion request message, to the originator. Herein, the deletion response message may indicate a deletion failure status of a resource according to a request of the originator.

When a deletion request message for requesting the deletion of a resource is transmitted two times, the receiver may retain the stand-by status from the time of receiving the first deletion request message to the time of receiving the second deletion request message. Before receiving the second deletion request message transmitted from the originator, the receiver may be configured to receive a deletion request message from another originator before. Herein, to prevent a situation in which the deletion request message from the another originator is recognized as the second deletion request message, the receiver may exchange an operation ID attribute with the originator in a process of deleting a resource. A process of deleting a resource based on operation ID information may be described as follows.

Figure 9:
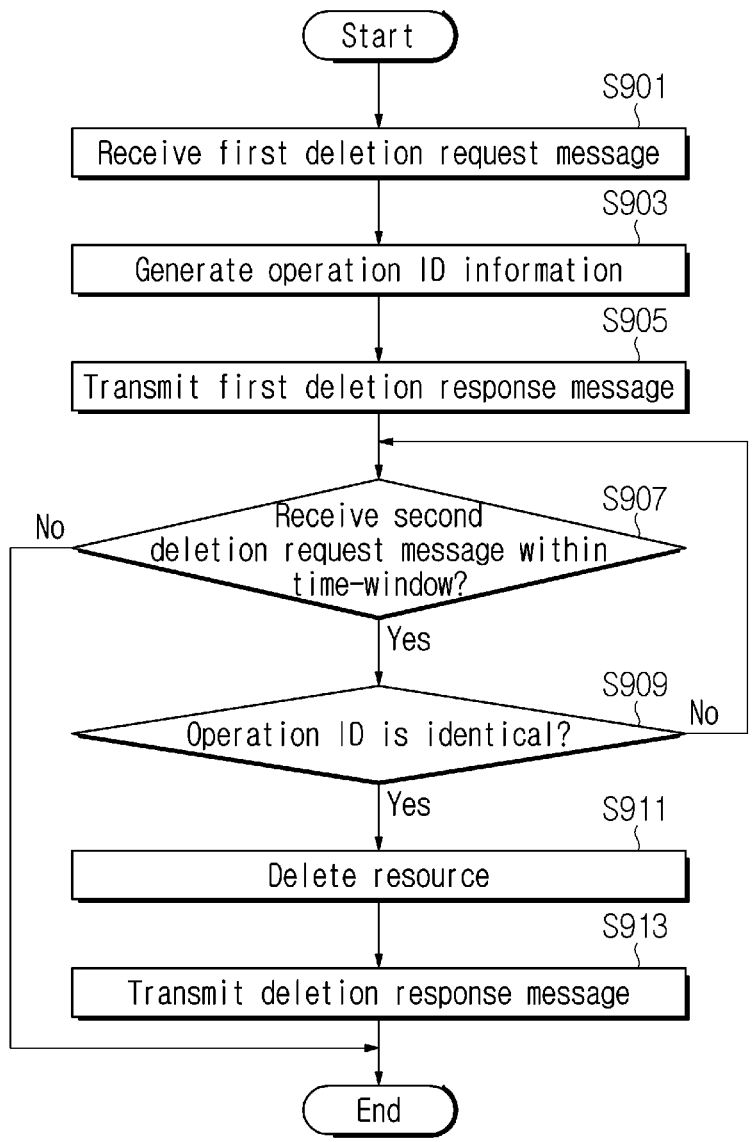
FIG. 9 is a view showing a process of deleting a resource based on operation ID information in an M2M system according to the present disclosure.

FIG. 9 is a view showing a process of deleting a resource based on operation ID information in an M2M system according to the present disclosure. The operation subject of FIG. 9 may be a receiver receiving a request of a specific operation (e.g., deletion) for a resource. Referring to FIG. 9, in the step S901, the receiver is configured to receive a first deletion request message requesting deletion of a resource from the originator. When the resource indicated by the first deletion request message includes an attribute related to a confirmation-based operation, the receiver may be configured to suspend an operation of deleting the resource.

In the step S903, the receiver may be configured to generate operation identifier information for identifying a request operation indicated by the first deletion request message. For example, operation identifier information for identifying a request operation indicated by the first deletion request message may be referred to as 'operation ID information'. Operation ID information may be related to at least one of the originator of the first deletion request message, an operation requested by the originator, and target data and/or resource of operation.

In the step S905, the receiver is configured to transmit the first deletion response message including the generated operation ID information to the originator. Herein, the operation ID information of the first deletion response message may be indicated by a transaction ID and/or an HTTP session ID. The originator receiving the first deletion response message may be configured to perform a confirmation operation for a deletion operation. The originator is configured to transmit a second deletion request message requesting deletion of a resource to the receiver. When the originator sending the first deletion request message transmits the second deletion request message, the second deletion request message may include operation ID information included in the first deletion response message.

In the step S907, the receiver may be configured to confirm whether the second deletion request message is received within a time-window. In other words, the receiver may be configured to remain in the standby mode for reception of the second deletion request message during the time-window. When the second deletion request message is received within the time-window, the receiver may be configured to end a deletion operation initiated by the first deletion request message.

When the second deletion request message is received within the time-window, the receiver, in the step S909, may be configured to confirm whether an operation identifier of a first deletion response message is identical with an operation identifier of the second deletion request message. Based on a comparison result between the operation identifier of the first deletion response message and the operation identifier of the second deletion request message, the receiver may be configured to confirm whether a sending subject of the first deletion request message is identical with a sending subject of the second deletion request message. In other words, when the operation identifier of the second deletion request message is identical with the operation identifier of the first deletion response message, the first deletion request message and the second deletion request message may be deletion requests that are related to each other.

When the operation identifier of the first deletion response message is identical with the second deletion request message, the sending subject of the second deletion request message is identical with the sending subject of the first deletion request message. On the other hand, when the operation identifier of the first deletion response message is identical with the second deletion request message, the sending subject of the second deletion request message may be different from the sending subject of the first deletion request message. Based on whether the sending subject of the first deletion request message is identical with the sending subject of the second deletion request message, the originator may be configured to determine whether a deletion operation of resource is performed.

When the operation identifier of the first deletion response message is not identical with the operation identifier of the second deletion request message, the receiver is configured to suspend the deletion of a resource indicated by the first deletion request message and the second deletion request message. The receiver may return to the step S907 and stand by for reception of the second deletion request message from the originator that transmits the first deletion request message. According to an exemplary embodiment, the receiver may be configured to remain in a stand by mode for reception of the second deletion request message until the end of a time-window indicated by an attribute of resource.

When the operation identifier of the first deletion response message is identical with the operation identifier of the second deletion request message, the receiver in the step S911 may be configured to delete a resource indicated by the first deletion request message and the second deletion request message. The receiver may be configured to confirm whether the originator sending the first deletion request message has a resource deletion right and whether there exists a resource indicated by the first deletion request message and may be configured to delete the resource.

In the step S913, the receiver is configured to transmit a second deletion response message for the second deletion request message to the originator. Herein, the second deletion response message may include parameters of a response message of an M2M system and specifically may include a response status, a request identifier and an operation identifier. When the operation identifier of the first deletion response message is identical with the operation identifier of the second deletion request message, a response status may indicate a deletion complete status of resource according to a request of the originator.

In order to indicate a confirmation-based operation to the originator, according to an exemplary embodiment, the receiver may use a separate response code asking confirmation for performing the operation in an M2M system. According to another exemplary embodiment, the receiver may be configured to request confirmation whether to perform the operation, while performing a response procedure concerning an operation request message. Alternatively, when a resource including an attribute related to the confirmation-based operation is discovered by an application entity and the application entity is to perform the confirmation-based operation for the resource, the application entity may be configured to perform a pop-up about whether to perform the operation or obtain information confirming the operation. After obtaining the information confirming the operation, the application entity may be configured to transmit an intended operation request message.

Figure 10:
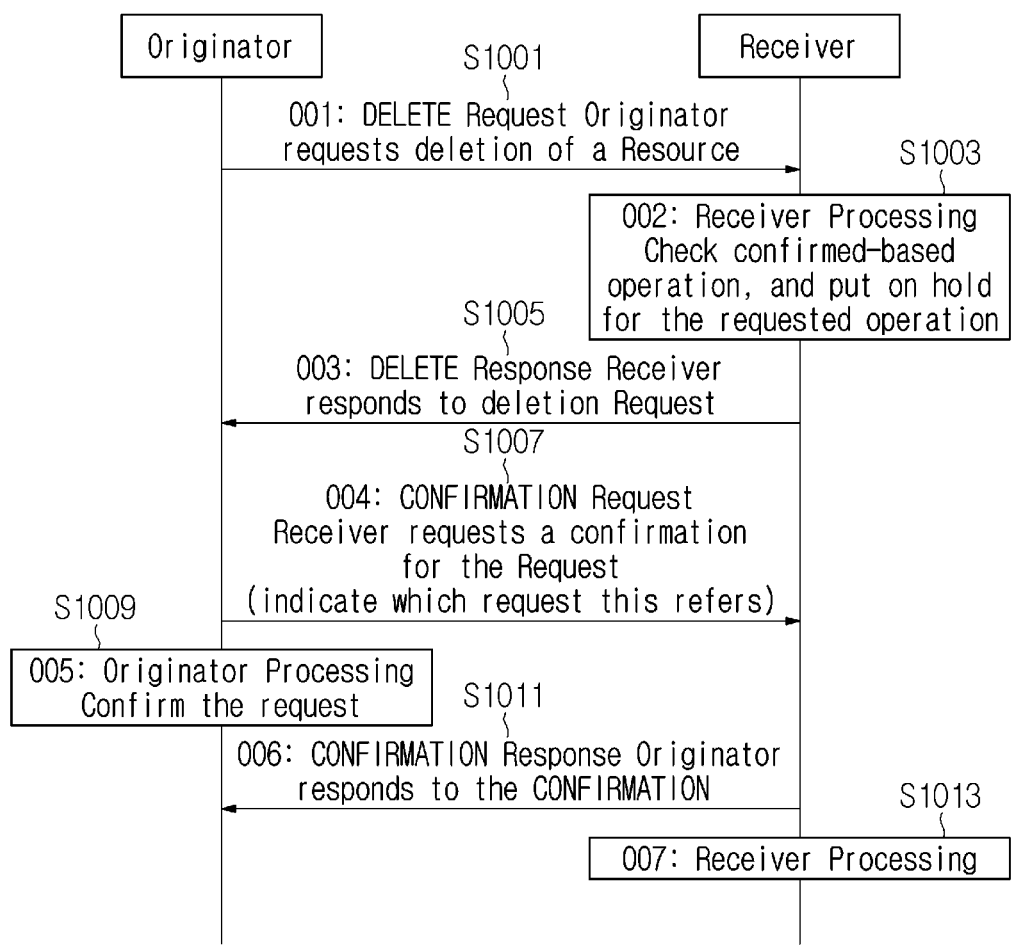
FIG. 10 is a view showing a first embodiment of a process for indicating a confirmation-based operation and for deleting a resource in an M2M system according to the present disclosure.

FIG. 10 is a view showing a first exemplary embodiment of a process for indicating a confirmation-based operation and for deleting a resource in an M2M system according to the present disclosure. The operation subjects of FIG. 10 may be an originator and a receiver. Referring to FIG. 10, in the step S1001, the originator is configured to transmit a request message asking deletion of a resource to the receiver. A deletion request message may include parameters of a request message of an M2M system and specifically include information indicating an operation to be requested, a sending subject, a receiving subject, and a request identifier specifying the deletion request message.

In step S1003, the receiver may be configured to confirm whether a deletion operation of the resource indicated by the deletion request message is a confirmation-based operation. The receiver may be configured to confirm whether the originator sending the deletion request message has a resource deletion right and whether there exists a resource indicated by the deletion request message. When the resource indicated by the deletion request message includes an attribute related to a confirmation-based operation, the receiver may be configured to suspend an operation of deleting the resource.

In the step S1005, the receiver is configured to transmit a deletion response message for the deletion request message to the originator. Herein, the deletion response message may include a response status and a request identifier specifying request information and include parameters of a response message of an M2M system. Herein, the response status may indicate ACK for a deletion request message. In the step S1007, the receiver is configured to transmit a confirmation request message asking confirmation for a deletion request of resource to the originator. A confirmation request message may include information indicating a sending subject, a receiving subject, and a request identifier specifying a deletion request message.

In the step S1009, the originator may be configured to perform a confirmation process for a deletion request of resource. The originator may be configured to confirm an attribute related to a confirmation-based operation included in a resource indicated by a deletion response message and/or a confirmation request message and perform a deletion confirmation process of resource indicated by the deletion response message and/or the confirmation request message. In the step S1011, the originator is configured to transmit a confirmation response message indicating that confirmation for a deletion request of resource is completed to the receiver. The confirmation response message may include information indicating a sending subject, a receiving subject, and a request identifier specifying a deletion request message.

In the step S1013, the receiver may be configured to delete a resource indicated by a deletion request message. Based on whether the originator sending the deletion request message has a resource deletion right and whether there exists a resource indicated by the deletion request message, the receiver may be configured to delete the resource indicated by the deletion request message.

Figure 11:
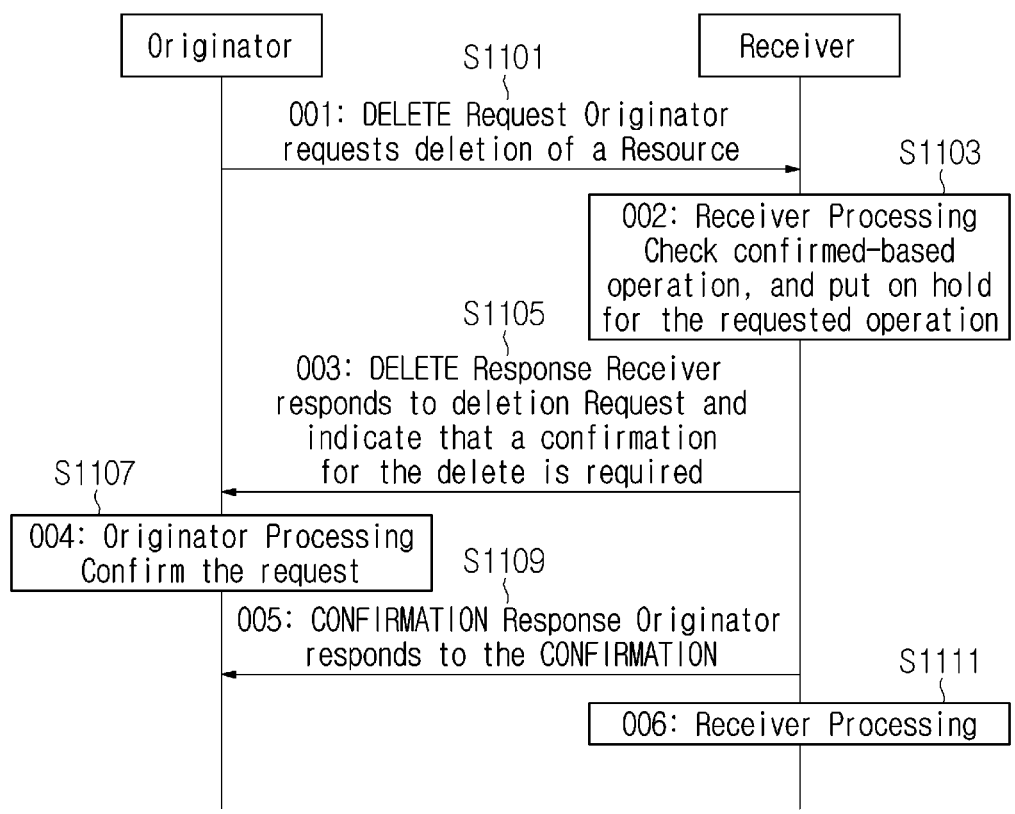
FIG. 11 is a view showing a second embodiment of a process for indicating a confirmation-based operation and for deleting a resource in an M2M system according to the present disclosure.

FIG. 11 is a view showing a second exemplary embodiment of a process for indicating a confirmation-based operation and for deleting a resource in an M2M system according to the present disclosure. The operation subjects of FIG. 11 may be an originator and a receiver. Referring to FIG. 11, in the step S1101, the originator is configured to transmit a request message asking deletion of a resource to the receiver. A deletion request message may include parameters of a request message of an M2M system and specifically include information indicating an operation to be requested, a sending subject, a receiving subject, and a request identifier specifying the deletion request message.

In step S1103, the receiver may be configured to confirm whether a deletion operation of the resource indicated by the deletion request message is a confirmation-based operation. The receiver may be configured to confirm whether the originator sending the deletion request message has a resource deletion right and whether there exists a resource indicated by the deletion request message. When the resource indicated by the deletion request message includes an attribute related to a confirmation-based operation, the receiver may be configured to suspend an operation of deleting the resource.

In the step S1105, the receiver is configured to transmit a deletion response message for the deletion request message to the originator. Herein, the deletion response message may include parameters of a response message of an M2M system and may specifically include a response status and a request identifier specifying request information. Herein, the response status may indicate ACK for a deletion response message. In addition, the deletion request message may further include information for asking confirmation of a deletion request to the originator.

In the step S1107, the originator may be configured to perform a confirmation process for a deletion request of resource. The originator may be configured to confirm an attribute related to a confirmation-based operation included in a resource indicated by a deletion response message and/or a confirmation request message and perform a deletion confirmation process of resource indicated by the deletion response message and/or the confirmation request message. In the step S1109, the originator is configured to transmit a confirmation response message indicating that confirmation for a deletion request of resource is completed to the receiver. The confirmation response message may include information indicating a sending subject, a receiving subject, and a request identifier specifying a deletion request message.

In the step S1111, the receiver may be configured to delete a resource indicated by a deletion request message. Based on whether the originator transmitting the deletion request message has a resource deletion right and whether there exists a resource indicated by the deletion request message, the receiver may be configured to delete the resource indicated by the deletion request message.

Figure 12:
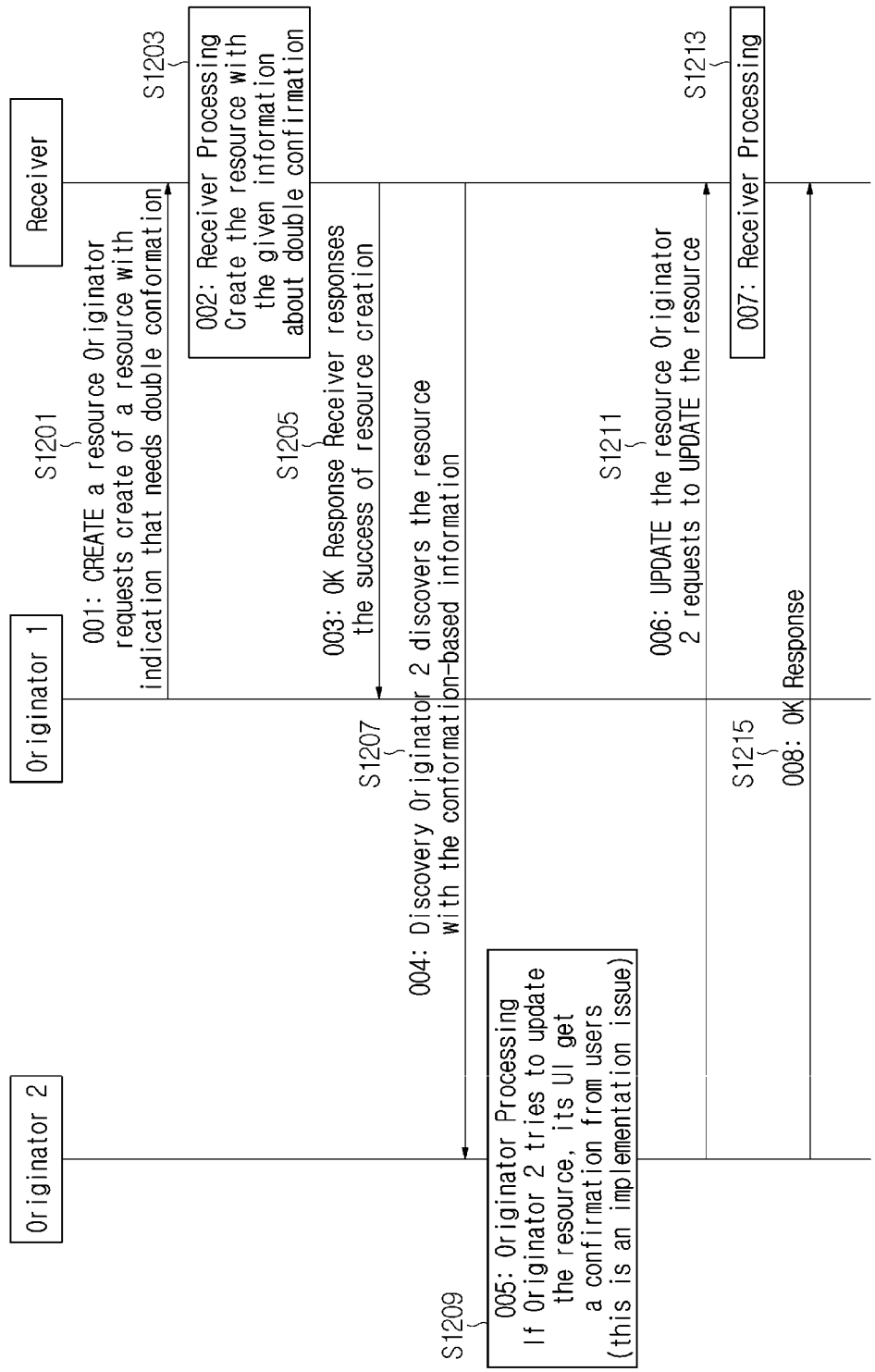
FIG. 12 is a view showing an embodiment of a process for indicating a confirmation-based operation and for updating a resource in an M2M system according to the present disclosure.

FIG. 12 is a view showing an exemplary embodiment of a process for indicating a confirmation-based operation and for updating a resource in an M2M system according to the present disclosure. The operation subjects of FIG. 12 may be originators and receivers. Referring to FIG. 12, in the step S1201, a first originator may be configured to request generation of a resource to a receiver. The first originator may be configured to transmit a resource generation request message to the receiver. The resource generation request message may include information indicating that confirmation is requested in resource setting.

In the step S1203, the receiver may be configured to perform a resource generation operation based on the resource generation request message received from the first originator. When the resource generation request message indicates that confirmation is requested in resource setting, the receiver may be configured to generate a resource including an attribute related to a confirmation-based operation. In the step S1205, the receiver may be configured to transmit a response to the resource generation request to the first originator. The receiver may be configured to transmit a resource generation response message to the first originator, and the resource generation response message may include information indicating that the generation of a resource including an attribute related to a confirmation-based operation is completed.

In the step S1207, a second originator may be configured to determine the resource that is generated between the first originator and the receiver. The resource discovered by the second originator may be a resource for confirmation-based data and may include an attribute related to a confirmation-based operation. In addition, the second originator may be configured to confirm an attribute related to a confirmation-based operation included in the discovered resource and confirm that the discovered resource is a resource performing a confirmation-based operation.

In the step S1209, the second originator may be configured to perform a confirmation operation for resource update. For example, the second originator may be configured to display information for asking a confirmation process for resource update to a user through a user interface (UI). The user may confirm the information for asking the confirmation process and input information indicating that confirmation is made for implementation of an update operation. In addition, the second originator may be configured to obtain confirmation information for update from the user and thus perform a confirmation operation for resource update.

In the step S1211, the second originator may be configured to request update of a resource to the receiver. The second originator may be configured to transmit a resource update request message to the receiver, and the resource update request message may include information that indicates an operation for a resource to be requested to the receiver. In the step S1213, the receiver may be configured to perform a resource update operation based on the received resource update request message. The receiver may be configured to perform an operation indicated by the resource update request message. In the step S1215, the receiver may be configured to transmit a response for a resource update request to the second originator. The receiver may be configured to transmit a response message for the resource update request to the second originator, and the response message for the resource update request may include information on an updated status of resource.

Referring to the description of FIG. 12, an exemplary embodiment is described in which a resource update operation is performed by the second originator. According to another exemplary embodiment, a resource update operation may be performed by the first originator. When the first originator performs a resource update operation, the first originator may be configured to skip a discovery process for a generated resource and display information for asking a confirmation process for resource update to a user through UI. In addition, the first originator may be configured to obtain confirmation information for update from the user and thus perform a confirmation operation for resource update and request update of resource to the receiver.

Referring to the description for FIGS. 7 to 12, a confirmation-based operation described herein is mainly a deletion and/or update operation of a resource. According to another exemplary embodiment, however, the confirmation-based operation performed for a resource in FIGS. 7 to 12 may be one operation of generation, addition, update and search. A resource may include an attribute related to a confirmation-based operation and may further include an attribute about operations to which the confirmation-based operation is applicable. The attribute about the operations to which the confirmation-based operation is applicable may indicate at least some operations among generation, addition, update and search for a resource.

A receiver may be configured to receive a first operation request message requesting an operation for a resource from an originator. The receiver may be configured to confirm whether the resource indicated by the first operation request message includes an attribute related to a confirmation-based operation. In addition, the receiver may be configured to confirm whether the operation indicated by the first operation request message is an operation to which a confirmation-based operation is applied. When the resource includes an attribute related to a confirmation-based operation and the operation indicated by the first operation request message is an operation to which the confirmation-based operation is applied, the receiver may be configured to transmit a first operation response message requesting a confirmation for the operation to the originator. The receiver may be configured to receive a second operation request message including information confirming the operation for a resource from the originator and perform the operation for the resource indicated by the second operation request message.

Figure 13:
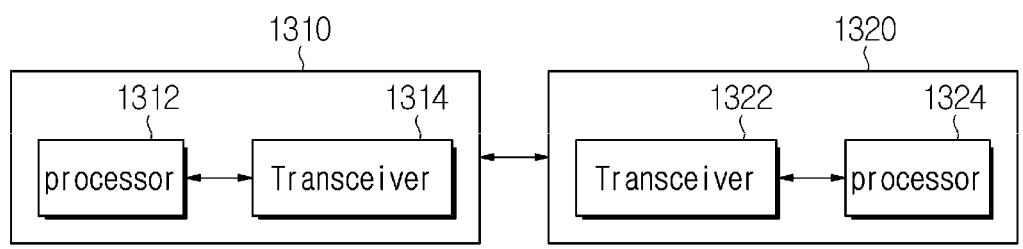
FIG. 13 is a view illustrating a configuration of M2M devices in an M2M system according to the present disclosure.

FIG. 13 is a view illustrating a configuration of M2M devices in an M2M system according to the present disclosure. Referring to FIG. 13, the M2M device 1310 may include the processor 1312 configured to operate a device and the transceiver 1314 configured to transmit and receive a signal. In particular, the processor 1312 may be configured to operate the transceiver 1314. In addition, the M2M device 1310 may be configured to perform a communication with another M2M device 1320. Another M2M device 1320 may also include the processor 1322 and the transceiver 1324, and the processor 1322 and the transceiver 1324 may be configured to perform the same function as the processor 1312 and the transceiver 1314.

For example, the originator and the receiver, which are described above, may be one of the M2M devices 1310 and 1320 of FIG. 13, respectively. In addition, the devices 1310 and 1320 of FIG. 13 may be different devices. For example, the devices 1310 and 1320 of FIG. 13 may be communication devices, vehicles or base stations. In other words, the devices 1310 and 1320 of FIG. 13 refer to devices, which may perform a communication, and are not limited to the above-described embodiments.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both inventions may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. An operation method of a machine-to-machine (M2M) apparatus in an M2M system, comprising:
   receiving, by a processor, a first operation request message requesting an operation for a resource from a counterpart M2M apparatus;
   generating, by the processor, operation identification (ID) information based on a reception result of the first operation request message;
   transmitting, by the processor, a first operation response message responding to the first operation request message to the counterpart M2M apparatus, the first operation response message including the operation ID information;
   receiving, by the processor, a second operation request message requesting the operation for the resource from the counterpart M2M apparatus responding to the first operation response message; and
   performing, by the processor, the operation for the resource based on the second operation request message, when the operation ID information in the second operation request message is identical with the operation ID information of the first operation response message
   wherein the operation for the resource comprises at least one of a deleting the resource or updating the resource.

2. The operation method of claim 1, wherein the operation response message includes information requesting confirmation for the operation for the resource.

3. The operation method of claim 2, wherein the second operation request message includes response information for the information requesting confirmation for the operation for the resource comprised in the first operation response message.

4. The operation method of claim 1, wherein the second operation request message is transmitted within a preset time-window from a reception time of the first operation request message.

5. The operation method of claim 1, further comprising:
   transmitting, to the counterpart M2M apparatus, a second operation response message indicating that the operation for the resource is performed.

6. An operation method of an M2M apparatus in an M2M system, comprising:
   transmitting, by a processor, a first operation request message requesting an operation for a resource to a counterpart M2M apparatus;
   receiving, by the processor, a first operation response message responding to the first operation request message from the counterpart M2M apparatus; and
   transmitting, by the processor, a second operation request message requesting the operation for the resource to the counterpart M2M apparatus responding to the first operation response message,
   the second operation request message including operation ID information that is identical with operation ID information of the first operation response message,
   wherein the operation for the resource comprises at least one of a deleting the resource or updating the resource.

7. The operation method of claim 6, wherein the operation response message includes information requesting confirmation for the operation for the resource.

8. The operation method of claim 7, wherein the second operation request message includes response information for the information requesting confirmation for the operation for the resource comprised in the first operation response message.

9. The operation method of claim 6, wherein the transmitting of the second operation request message to the counterpart M2M apparatus transmits the second operation request message within a preset time-window from a transmitting time of the first operation request message.

10. The operation method of claim 6, wherein the first operation response message further includes operation identification (ID) information that is generated by the counterpart M2M apparatus based on a reception result of the first operation request message.

11. The operation method of claim 6, further comprising:
    receiving, from the counterpart M2M apparatus, a second operation response message indicating that the operation for the resource is performed.

12. An M2M apparatus in an M2M system, comprising:
    a transceiver configured to transmit and receive a signal; and
    a processor configured to operate the transceiver,
    wherein the processor is further configured to:
    receive a first operation request message requesting an operation for a resource from a counterpart M2M apparatus,
    generate operation identification (ID) information based on a reception result of the first operation request message,
    transmit a first operation response message responding to the first operation request message to the counterpart M2M apparatus, the first operation response message including the operation ID information;
    receive a second operation request message requesting the operation for the resource from the counterpart M2M apparatus responding to the first operation response message, and
    perform the operation for the resource based on the second operation request message when the operation ID information in the second operation request message is identical with the operation ID information of the first operation response message,
    wherein the operation for the resource comprises at least one of a deleting the resource or updating the resource.

13. The M2M apparatus of claim 12, wherein the operation response message includes information requesting confirmation for the operation for the resource, and wherein the second operation request message includes response information for the information requesting confirmation for the operation for the resource that is comprised in the first operation response message.

14. The M2M apparatus of claim 12, wherein the second operation request message is transmitted within a preset time-window from a reception time of the first operation request message.

15. The M2M apparatus of claim 12, wherein the processor is further configured to transmit a second operation response message indicating that the operation for the resource is performed.

* * * * *